(12) United States Patent
Hurwitz et al.

(10) Patent No.: US 11,811,955 B1
(45) Date of Patent: Nov. 7, 2023

(54) SYSTEMS AND METHODS FOR IMPROVING RELIABILITY IN BLOCKCHAIN NETWORKS USING SHARDING

(71) Applicant: Alchemy Insights, Inc., San Francisco, CA (US)

(72) Inventors: Noam Hurwitz, San Francisco, CA (US); David Philipson, San Francisco, CA (US); Deepak Bansal, Round Rock, TX (US)

(73) Assignee: Alchemy Insights, Inc., San Francisco, CA (US)

( * ) Notice: Subject to any disclaimer, the term of this patent is extended or adjusted under 35 U.S.C. 154(b) by 0 days.

(21) Appl. No.: 18/087,915

(22) Filed: Dec. 23, 2022

(51) Int. Cl.
*H04L 29/06* (2006.01)
*H04L 9/00* (2022.01)
*H04L 9/32* (2006.01)

(52) U.S. Cl.
CPC .............. *H04L 9/50* (2022.05); *H04L 9/3236* (2013.01); *H04L 2209/463* (2013.01)

(58) Field of Classification Search
CPC .... H04L 9/50; H04L 9/3236; H04L 2209/463
See application file for complete search history.

(56) References Cited

U.S. PATENT DOCUMENTS

| | | | |
|---|---|---|---|
| 5,371,878 A | 12/1994 | Coker | |
| 8,086,732 B1 | 12/2011 | Volz et al. | |
| 8,554,929 B1 | 10/2013 | Szeto et al. | |
| 9,613,120 B1 | 4/2017 | Kharatishvili et al. | |
| 11,281,975 B1 | 3/2022 | Isaksson et al. | |
| 11,728,976 B1 | 8/2023 | Godlove et al. | |
| 11,750,711 B1 | 9/2023 | Philipson et al. | |
| 2008/0098349 A1 | 4/2008 | Lin et al. | |
| 2010/0293335 A1 | 11/2010 | Muthiah et al. | |
| 2011/0078705 A1 | 3/2011 | Maclinovsky | |

(Continued)

FOREIGN PATENT DOCUMENTS

| CN | 109992993 A | 7/2019 |
|---|---|---|
| CN | 112150130 | * 12/2020 |

(Continued)

OTHER PUBLICATIONS

Koul, Rohan, "Blockchain Oriented Software Testing—Challenges and Approaches", IEEE, 2018 3rd International Conference for Convergence in Technology (I2CT), The Gateway Hotel, XION Complex, Wakad Road, Pune, India. Apr. 6-8, 2018, pp. 1-6.

(Continued)

*Primary Examiner* — Taghi T Arani
*Assistant Examiner* — Lin Chang
(74) *Attorney, Agent, or Firm* — Carr & Ferrell LLP

(57) ABSTRACT

Systems and methods for improving reliability in blockchain networks using sharding are disclosed herein. An example method includes assigning a unique identifier to a user, applying a deterministic function, such as a consistent hashing algorithm, to the unique identifier to select a unique set of nodes that are assigned to a shard for the user, wherein the nodes are a subset of available nodes, receiving a request for blockchain data from the user, generating a response to the request using a consistent view of a blockchain obtained from the unique set of nodes, and transmitting the response to the request to the user.

23 Claims, 7 Drawing Sheets

(56) References Cited

U.S. PATENT DOCUMENTS

| | | |
|---|---|---|
| 2011/0161488 A1 | 6/2011 | Anderson |
| 2012/0310878 A1 | 12/2012 | Vuksan et al. |
| 2016/0283348 A1 | 9/2016 | Golde et al. |
| 2017/0091069 A1 | 3/2017 | Fujiwara et al. |
| 2018/0089041 A1* | 3/2018 | Smith .................. H04L 9/3239 |
| 2018/0145836 A1* | 5/2018 | Saur .................... G06Q 20/3829 |
| 2018/0198714 A1* | 7/2018 | Krieger ................ H04L 47/19 |
| 2018/0300227 A1 | 10/2018 | Bergen |
| 2019/0171451 A1 | 6/2019 | Hardy et al. |
| 2020/0097953 A1* | 3/2020 | Islam .................. G06Q 20/0658 |
| 2020/0183818 A1 | 6/2020 | Guenther et al. |
| 2020/0233858 A1* | 7/2020 | Deng .................... H04L 9/3247 |
| 2020/0286026 A1* | 9/2020 | Dahod ................. G06F 16/137 |
| 2020/0374113 A1 | 11/2020 | Noam et al. |
| 2020/0396065 A1 | 12/2020 | Gutierrez-Sheris |
| 2021/0067319 A1* | 3/2021 | Chung ................. H04L 9/3239 |
| 2021/0097484 A1 | 4/2021 | Ramos et al. |
| 2021/0124730 A1 | 4/2021 | Kannan et al. |
| 2021/0201328 A1 | 7/2021 | Gunther |
| 2021/0240733 A1* | 8/2021 | Kramer ................ H04L 9/3297 |
| 2021/0263719 A1 | 8/2021 | Pai et al. |
| 2021/0304205 A1 | 9/2021 | Saka et al. |
| 2021/0314154 A1* | 10/2021 | Husson ................ G06F 21/64 |
| 2022/0004539 A1* | 1/2022 | De Caro ............... H04L 63/12 |
| 2022/0027348 A1* | 1/2022 | Manevich ............. H04L 9/085 |
| 2022/0027970 A1* | 1/2022 | Kim ..................... H04L 9/3239 |
| 2022/0159069 A1* | 5/2022 | Shirley ................ H04L 67/568 |
| | | 713/157 |
| 2022/0173893 A1 | 6/2022 | Basu et al. |
| 2022/0335049 A1 | 10/2022 | Hacigumus et al. |
| 2023/0098185 A1 | 3/2023 | Carver et al. |

FOREIGN PATENT DOCUMENTS

| | | |
|---|---|---|
| KR | 101796690 B1 | 11/2017 |
| WO | WO2020259352 A1 | 12/2020 |

OTHER PUBLICATIONS

Hertz, "How to Implement Caching Layers in Web3 Products", Sep. 22, 2022, productcoalition.com, https://productcoalition.com/how-to-implement-caching-layers-in-web3-products-feca245bc5c6, 6 pages.

Wang et al., "Decentralized Caching for Content Delivery Based on blockchain: A Game Theoretic Perspective", Jan. 23, 2018, arxiv.org, https://arxiv.org/pdf/1801.07604.pdf, 6 pages.

Basu et al., "Adaptive TTL-Based Caching for Content Delivery", Dec. 9, 2017, arxiv.org, https://arxiv.org/pdf/1704.04448.pdf, 27 pages.

Cecchet, "Encyclopedia of Database Systems", 2009, Springer, 212 pages.

Porru et al., "Blockchain-Oriented Software Engineering: Challenges and New Directions," IEEE-2017 IEEE/ACM 39th International Conference on Software Engineering Companion (ICSE-C), May 20-28, 2017, pp. 1-4.

* cited by examiner

SYSTEMS AND METHODS FOR IMPROVING RELIABILITY IN BLOCKCHAIN NETWORKS USING SHARDING

CROSS-REFERENCE TO RELATED APPLICATIONS

This application is related to U.S. Ser. No. 18/083,421, filed on Dec. 16, 2022 entitled "Systems and Methods for Creating a Consistent Blockchain Including Block Commitment Determinations," which is hereby incorporated by reference herein in its entirety, for all purposes. The present utility patent application is also related to U.S. Ser. No. 18/087,761, filed Dec. 22, 2022 entitled "System and Method for High Performance Providing Fresh NFT Metadata," U.S. Ser. No. 18/087,799, filed Dec. 22, 2022 entitled "Systems and Methods for Efficiently Serving Blockchain Requests Using an Optimized Cache," U.S. Ser. No. 18/087,732, filed Dec. 22, 2022 entitled "Systems and Methods for Adaptively Rate Limiting Client Service Requests at a Blockchain Service Provider Platform," and U.S. Ser. No. 18/087,746, filed Dec. 22, 2022 entitled "System and Method for Intelligent Testing of Blockchain Applications Using a Shadow System." The contents of each of these above-mentioned applications are incorporated herein by reference for all purposes to the extent that such subject matter is not inconsistent herewith or limiting hereof.

TECHNICAL FIELD

This disclosure pertains to blockchain technology, and more particularly, but not by way of limitation, to systems and methods for maintaining and increasing reliability in blockchain networks using shuffle-sharding and consistent hashing processes.

SUMMARY

According to some embodiments, the present disclosure is directed to a method comprising assigning a unique identifier to a user; assigning a unique group of nodes to the user; recording a mapping of the nodes to the user in a database; receiving a request for blockchain data from the user; determining the nodes that are mapped to the user from the database; generating a response to the request using a consistent view of a blockchain obtained from the nodes; and transmitting the response to the request to the user.

According to some embodiments, the present disclosure is directed to a method comprising assigning a unique identifier to a user; applying a deterministic function to the unique identifier to select a unique set of nodes that are assigned to a shard for the user, wherein the nodes are a subset of available nodes; receiving a request for blockchain data from the user; generating a response to the request using a consistent view of a blockchain obtained from the unique set of nodes; and transmitting the response to the request to the user.

According to some embodiments, the present disclosure is directed to a system comprising a processor and a memory for storing instructions, the instructions being executed by the processor to assign a unique identifier to a user; assign a unique group of nodes to the user; record a mapping of the nodes to the user in a database; receive a request for blockchain data from the user; determine the nodes that are mapped to the user from the database; generate a response to the request using a consistent view of a blockchain obtained from the nodes; and transmit the response to the request to the user.

According to some embodiments, the present disclosure is directed to a method comprising assigning a unique user identifier to each of a plurality of users; generating a plurality of user identifier hashes for each of the unique user identifiers; generating a plurality of node identifier hashes for each of a plurality of nodes in a blockchain network; and assigning nodes to each of the requesters by randomly distributing the plurality of user identifier hashes for each of the unique user identifiers and the plurality of node identifier hashes for each of the plurality of nodes to positions in a logical construct, wherein nodes are assigned to requesters in such a way that none of the plurality of users are assigned a same set of nodes as another user.

BRIEF DESCRIPTION OF DRAWINGS

Exemplary embodiments are illustrated by way of example and not limitation in the figures of the accompanying drawings, in which like references indicate similar elements.

DETAILED DESCRIPTION OF EXAMPLE EMBODIMENTS

Overview

Figure 1:
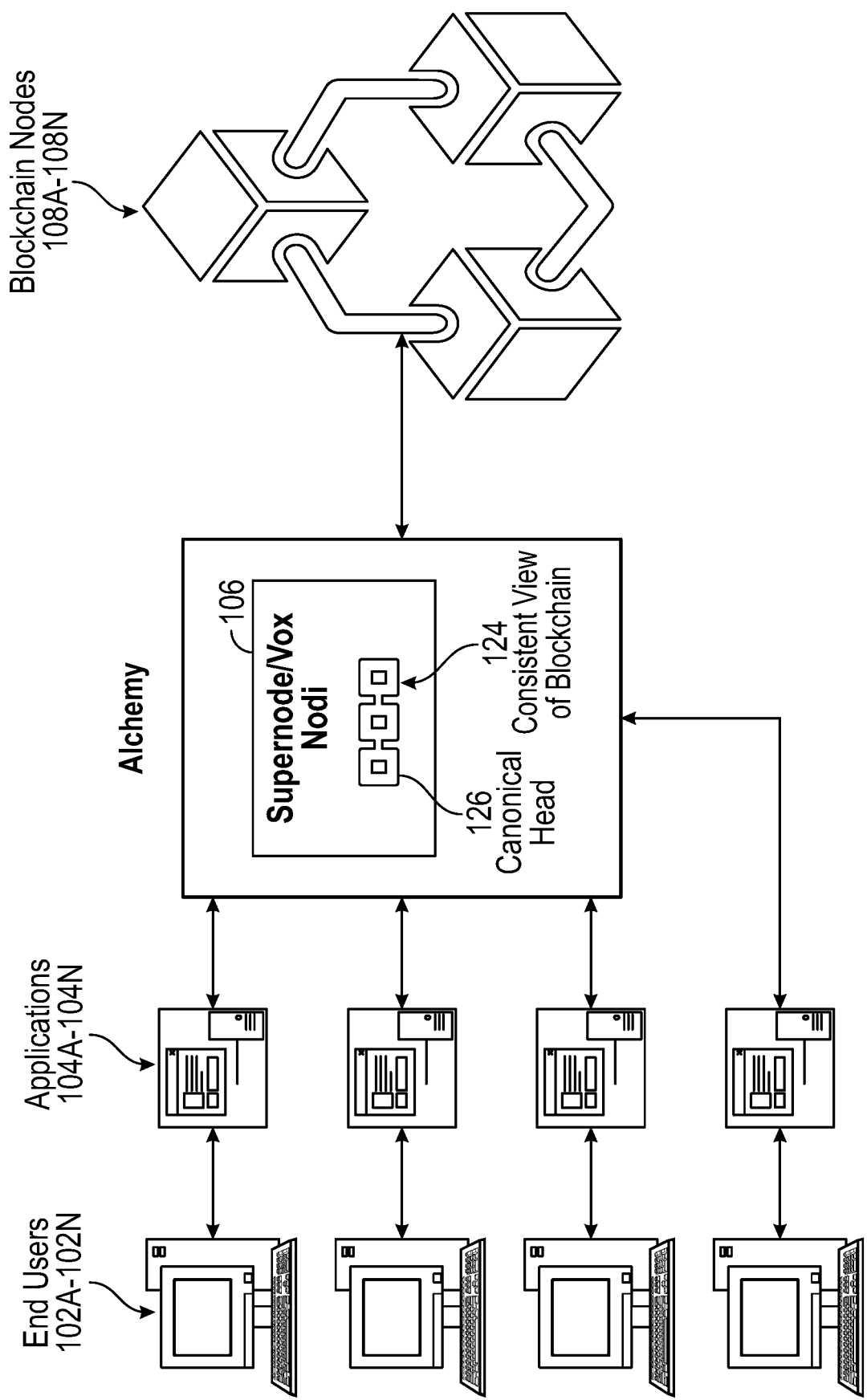
FIG. 1 is an example environment where aspects of the present disclosure can be implemented for use.

A state is the set of data that represents information currently relevant to applications on a blockchain. A blockchain network strictly needs to keep track of the state of the chain. For a cryptocurrency, this is simply ownership balances; in more complex applications this could refer to other data structures that the application in question needs to keep track of (e.g., who has a particular domain name, what is the status of a given contract, and so forth).

Sharding is a process that divides a network of a blockchain organization into several smaller networks, referred to as "shards." In the context of this disclosure, a shard is an assigned subset of nodes in a blockchain network that are used to serve requests.

In some instances, users may provide requests to a blockchain network that are deleterious to the operation of the blockchain nodes. An example can include a query of death, which can cause disruption in the nodes. A query of death can be malicious in nature such as a denial of service attack or can also be benign, but have a similar effect. Regardless of the cause, when too many nodes are shared between too many requesters, problems with nodes may be experienced amongst many users.

To reduce a likelihood that these issues will affect individual users, the systems and methods may randomly assign the nodes to shards in a shuffling procedure, referred to herein as shuffle sharding. In general, shuffle sharding can include the assigning of a percentage of all available nodes in a blockchain network to a requester. The shard that is created can be on a per-requester basis and includes a randomly assigned number of nodes. In one example, each shard is assigned a percentage of the available nodes in the network. For example, each shard can be assigned 10% of the available nodes in the network, however, this is merely a non-limiting example. Requesters can be assigned nodes in a randomly deterministic manner. In some embodiments, no requester is assigned the same nodes as another requester. Thus, each requester has its requests served by a unique group of nodes out of all the available nodes in the blockchain network.

A shard (group of nodes) can be assigned to a requester using a unique identifier and a process of consistent hashing that involves the use of a deterministic function. In one embodiment, unique identifiers for both requesters and nodes can be generated and used to assign nodes to requesters using a process called consistent hashing. An example system can place the unique identifiers for users and nodes into a logical construct having positions. Each requester hash and node hash can be assigned one of these positions. A node is assigned to a requester when they overlap at a position. In some instances, the system can ensure that no two requesters are assigned the exact same nodes as one another. For example, if ten of the exact same nodes were to be serving requests from a first requester and a second requester, if requester one performs malicious actions that affect the performance of the nodes that the second requester is not also negatively affected due to having the exact same nodes. Using shuffle sharding, while some of the nodes may overlap and the second requester may experience some degradation in response time, they may not have the exact same nodes as the first requester, which may all be deleteriously affected by the behavior of the first requester. In this way, shuffle sharding allows for isolation between requesters. This isolation also protects nodes from deleterious requesters due to nodes having limited overlap between shards.

In sum, the systems and methods disclosed herein provide means to ensure reliability and consistency for applications, users, or other endpoints that utilize blockchain data. In some instances, the systems and methods implement a process of shuffle sharding to ensure that endpoints can have their requests responded to in a fair, equitable, and reliable manner.

EXAMPLE EMBODIMENTS

Referring now to FIG. 1, which illustrates an example architecture where aspects of the present disclosure are implemented. The architecture comprises a plurality of end user systems 102A-102N, a plurality of applications 104A-104N, a supernode 106, and a plurality of blockchain nodes 108A-108N. The elements of the architecture can communicatively couple with one another over a network or a plurality of networks, as would be known to one of ordinary skill in the art with the present disclosure before them. For example, the network may include any one or a combination of multiple different types of networks, such as cable networks, the Internet, wireless networks, and other private and/or public networks. In some instances, the network may include cellular, Wi-Fi, or Wi-Fi direct. Any suitable network may be used herein.

The end user systems 102A-102N can include any suitable computing device for any user that desires to obtain blockchain data. While the example architecture illustrates access to the blockchain data through one or more decentralized applications, the end user systems 102A-102N may also be allowed to request blockchain data directly from the supernode 106, if desired. That is, the supernode architecture can include an application development environment that can be used to create and access applications by an end user computing device.

The applications 104A-104N can include decentralized applications, and may be referred to herein as such. However, this disclosure is not limited to use with decentralized applications. The applications or other end points can access the supernode through a gateway or application programming interface.

The supernode 106 can service any application developed using cryptocurrency and smart contracts, which are deployed on a blockchain network. These applications can be used to read/write blockchain data, mint/access/transfer NFTs, or any other desired service related to blockchain data. In general, the applications 104A-104N receive requests from the end user systems 102A-102N and receive responses from the supernode 106.

Very broadly, the supernode 106 can receive a request from the applications 104A-104N and provide the applications 104A-104N with a consistent representation of the blockchain 124 (consistent blockchain view) in response to the request. The consistent view of the blockchain has a canonical head 126 that is determined from a consensus approach executed by the supernode 106, as will be discussed in greater detail infra. The blockchain is built over time by successively adding canonical heads to the blockchain. Each of the new canonical heads is determined through consensus, ensuring that the entire canonical head is consistent.

In general, the supernode 106 obtains blockchain data from the plurality of blockchain nodes 108A-108N, and allows one or more of the plurality of blockchain nodes 108A-108N to vote for the canonical head (e.g., the newest block to be added to the consistent view of the blockchain). The supernode 106 is also capable of determining commitment levels for blocks in the consistent view of the blockchain.

Figure 2:
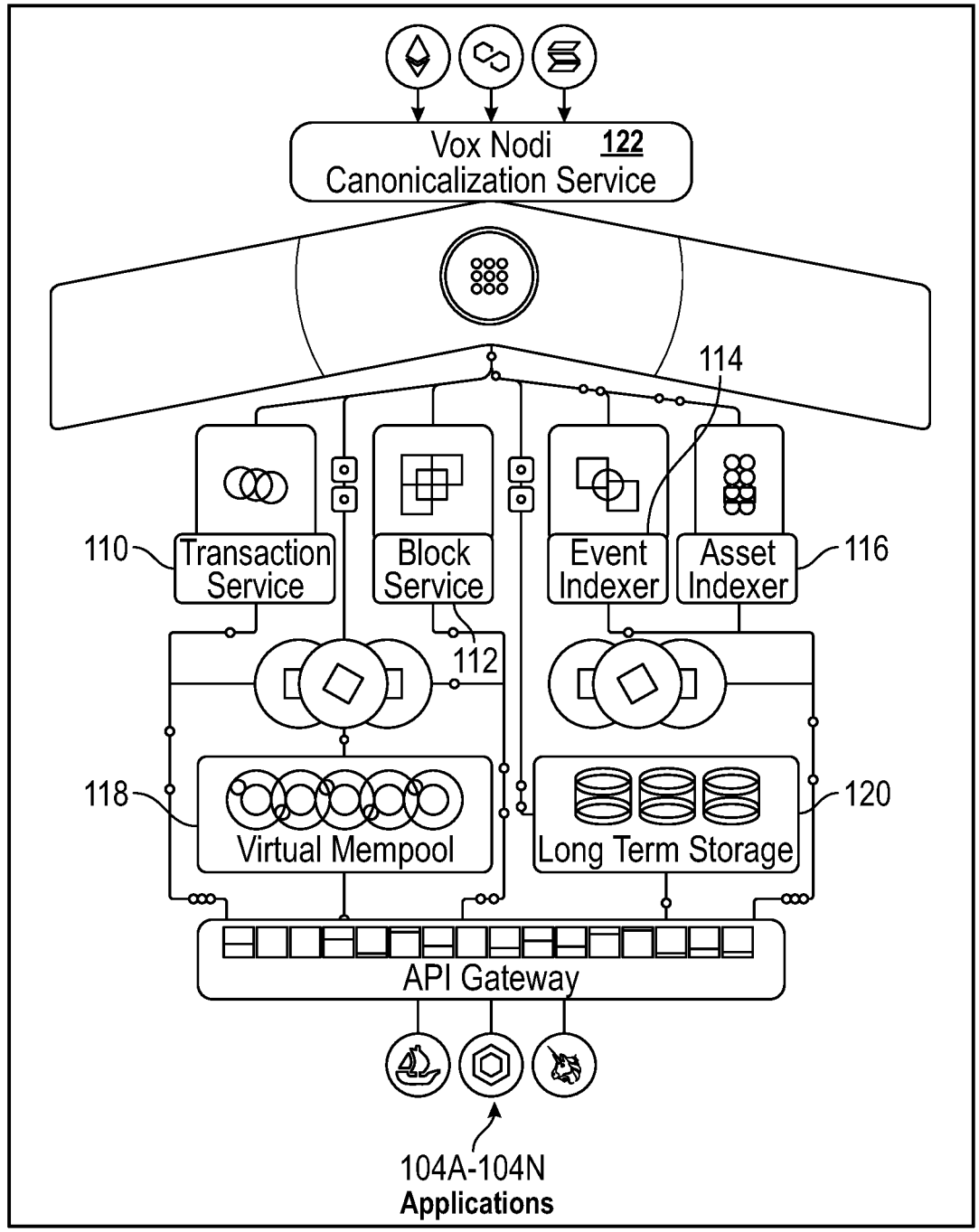
FIG. 2 is a schematic illustration of a "Supernode" of the present disclosure.

Referring now to FIG. 2, the supernode 106 is schematically illustrated as comprising a transaction service 110, a block service 112, an event indexer 114, an asset indexer 116, a virtual mempool 118, long-term storage 120, and a canonicalization service 122.

The transaction service 110 processes transaction-related data obtained from the blockchain. For example, a transaction could include the creation, modification, transfer, or other use of an NFT. The block service 112 can be used to detect and analyze blockchain blocks, again for the purposes of obtaining and analyzing block-related metadata. The event indexer 114 can be used to index events related to the blockchain or a block. Events can include blockchain object creation, modification, ownership transfers, and so forth.

The asset indexer 116 can be used to identify and index data related to assets such as digital currency, NFTs, smart contracts, or other similar assets that can be created and/or transferred through means of the blockchain. The virtual mempool 118 is a collection of pending transactions waiting for validation from a node before they are committed to a new block on the blockchain. The mempool is a staging area for unconfirmed transactions in a node. Every blockchain node in the network has a mempool, and they all intercommunicate to share information about the latest pending transactions. The long-term storage 120 can be used to store any data that is desired.

The canonicalization service 122 can be used to create a consistent view of the blockchain for the applications 104A-104N. The canonicalization service 122 can create a consistent view of the blockchain by first receiving proposed canonical heads from the plurality of blockchain nodes. The canonicalization service 122 can receive votes to determine a correct state for a consistent view of the blockchain that comprises a canonical head.

In some embodiments, the canonicalization service 122 can monitor the state and responsiveness of each of the plurality of blockchain nodes 108A-108N and determine if the proposed canonical head should be considered or excluded. For example, if a node offers old or outdated canonical heads, the canonicalization service 122 may exclude the node for a period of time. The excluded node can offer proposed canonical heads after a threshold period of time, such as a selectable number of minutes, hours, days, or other time period. The canonicalization service 122 can select this period of time automatically. Alternatively, an administrator can also set the threshold period of time.

Figure 3:
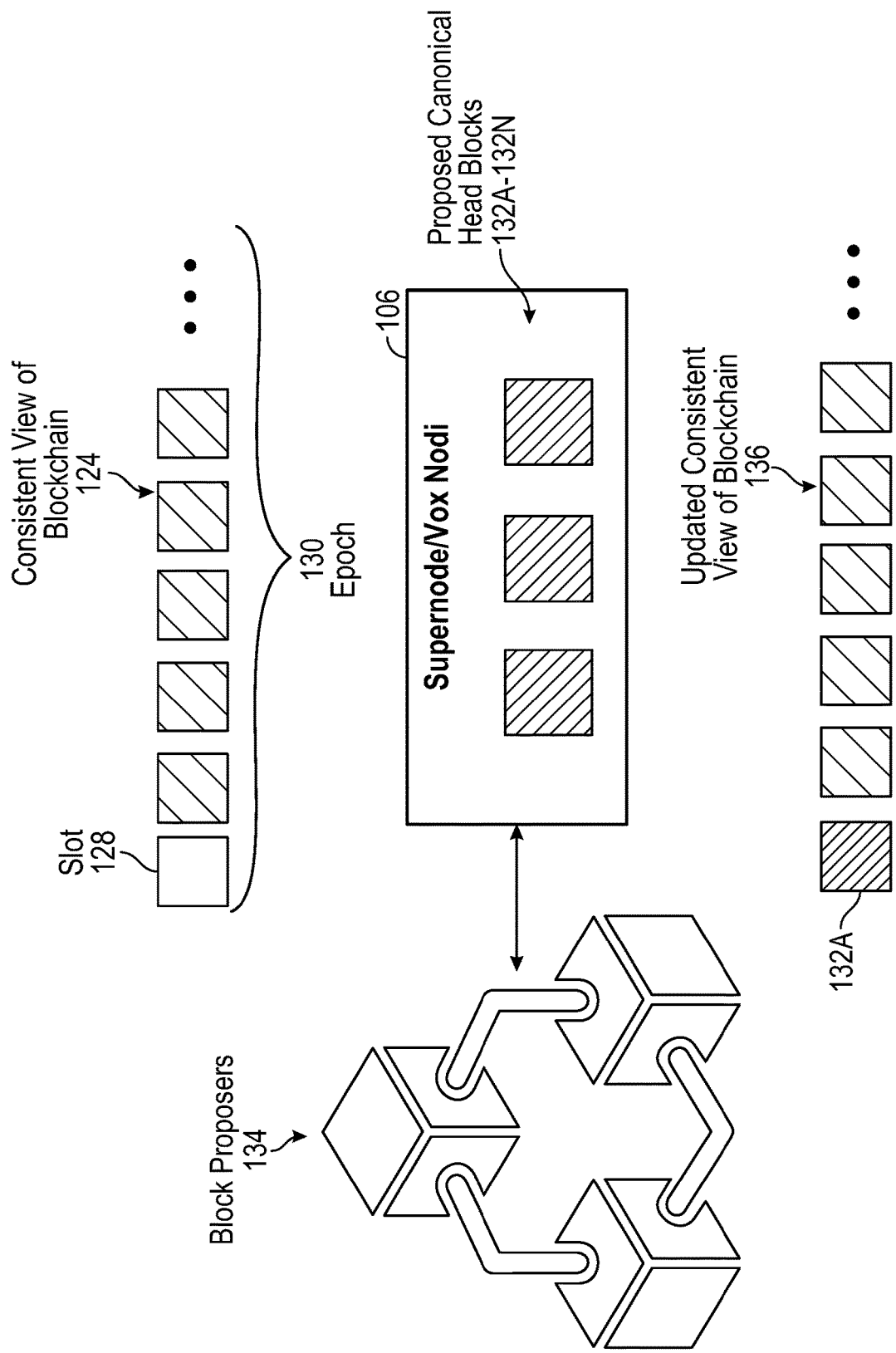
FIG. 3 schematically illustrates an example process for updating a consistent view of blockchain data with a new canonical head.

Referring now to FIG. 3, for context, blocks can be added to a consistent view of the blockchain 124 according to slots and epochs. A slot 128 is an opportunity for a block to be added to the chain. In some instances, slots occur approximately every twelve seconds. An epoch 130 is thirty-two slots, which occurs approximately every six minutes. As proposed canonical head blocks 132A-132N are received from the block proposers 134 (a group of nodes selected from the blockchain network), the supernode 106 can select one of the proposed canonical head blocks, such as block 132A to add to the consistent blockchain to create an updated consistent view 136 of the blockchain. Methods for selecting the appropriate proposed canonical head are disclosed in greater detail herein.

In more detail, some of the blockchain nodes in the plurality of blockchain nodes 108A-108N are referred to as validator nodes. A validator is a participant in proof of stake consensus. In some instances, validators need to submit a security deposit in order to get included in the validator set. Proof of stake can include a method by which a cryptocurrency blockchain protocol aims to achieve decentralized consensus. The proof of stake asks users to prove ownership of a certain amount of cryptocurrency (their "stake" in the network) in order to be able to participate in the validation of transactions. A security deposit could be a quantity of Ether (i.e., the token associated with the Ethereum blockchain protocol) or other cryptocurrency or token that a user deposits into a mechanism (often a proof of stake consensus mechanism, though this can also be used for other applications) that a user expects to be able to eventually withdraw and recover, but which can be taken away in the event of user malfeasance.

In some instances, validators are randomly selected by the canonicalization service 122 for every slot to propose a block during a proof of stake. Again, each block that is added to the chain is essentially a new canonical head. These validators may also be known as block proposers. If the validator does not propose a block in their slot (e.g., if the validator is offline) the canonicalization service 122 can place an empty slot in that position and move on to the next one. Otherwise, if the block is created, a randomly chosen committee of validators (attesters) will first verify that the new block is valid then submit a vote (attestation) that the block is valid to the network.

In some embodiments, all or a subset of the plurality of blockchain nodes 108A-108N can suggest a block as the canonical head for the blockchain. The canonicalization service 122 can receive these votes and determine the canonical head using any specified methodology disclosed herein. For example, the canonical head can be selected based on an aggregate number of votes, or the largest number of nodes offering the same block as the new canonical head. As noted, the canonicalization service 122 can ignore votes from nodes that have latency issues or other deleterious behaviors. That is, while latency or "slowness" is one factor that can be used to exclude a node from voting (or allow the canonicalization service 122 to ignore the vote), other node behaviors can also be used. Further, it will be understood that voting can include the offering of a block as a proposed canonical head.

Once the canonical head has been chosen, this creates a correct state for the consistent view of the blockchain. This view of the blockchain is considered to be consistent because it is made from a series of canonical head blocks that were obtained through a consensus approach. The canonicalization service 122 can assemble and expose the consistent view of the blockchain to any of the decentralized applications requesting blockchain data.

The process for identifying the canonical head can include identifying and excluding uncle blocks. Uncle blocks occur when nodes on a network do not immediately accept a block into the blockchain. As a result, another node can build and propagate their block at a similar time. To confirm the legitimacy of constructed blocks, they must be broadcast throughout the network to all nodes, which may cause latency issues. These types of blocks can be excluded from consideration as the canonical head.

With respect to serving requests to a requester, the sharding service of the supernode 106 can be configured to create a shard for a requester. The shard can include a subset of the available nodes in the network. As noted, the sharding service can assign nodes to a requester through shuffle sharding. In general, shuffle sharding can include the sharding service assigning of a percentage of the plurality of blockchain nodes 108A-108N to a requester. The subset of nodes that is created can be on a per-requester basis and includes a randomly assigned number of the plurality of blockchain nodes 108A-108N. In one example, each shard is assigned a percentage of the available nodes in the network. For example, each shard can be assigned 10% of the available nodes in the network, however, this is merely a non-limiting example.

Requesters can be assigned nodes in a randomly deterministic manner. In some embodiments, no requester is assigned the exact same nodes as another requester. Thus, each requester has its requests served by a unique group of nodes out of all the available nodes in the blockchain network. Groups of nodes can be assigned to a requester using a unique identifier and a process of consistent hashing. In more detail, when a requester is identified based on the submission of a request to the supernode 106, the sharding service can assign the requester a unique identifier (referred to in some instances as a team identifier). The sharding service can then create a consistent deterministic hash value of the unique identifier. That is, a hashing function is salted with the unique user identifier. The consistent hashed value is then used to select the nodes for the shard. In some embodiments, the unique identifier is hashed a number of times to generate a plurality of consistent hash values that are used to select the nodes. That is, the number of consistent hash values generated may equal the number of nodes for the shard. In some embodiments, each unique identifier can be hashed a plurality of times. The plurality of user identifier hash values or "UID hashes" can be used in a random node assignment process, which is disclosed herein.

In some embodiments, each node can also be assigned a unique identifier, referred to as a node identifier or "NID". The NID can also be hashed using a deterministic hashing function a plurality of times to create a plurality of node identifier hash values or "NID hashes". Thus, each unique user identifier is hashed a plurality of times and each unique node identifier is hashed a plurality of times. While this example process has been disclosed, any suitable consistent hashing function can be used herein.

Once these hash values for users and nodes have been created, an example system can distribute both the user identifier hashes and the node identifier hashes to a positional array or other similar logical construct in a random manner. The logical construct could include a matrix with columns and rows. Another logical construct could include a circle that has been subdivided into sectors. Each user identifier hash and node identifier hash can be randomly assigned to a sector. Regardless of the construct, the positions where a user identifier hash and a node identifier hash align (e.g., are co-located in the same sector or cell) indicate an assignment of a node to the requester.

As noted above, this process ensures that requesters are isolated from one another inasmuch as the nodes assigned to any given requester are both (1) a subset of all available nodes; and (2) that the nodes have been chosen through a randomly deterministic process. Thus, this process ensures that no two requesters have been assigned the exact same nodes for their respective shards. While some nodes between shards may overlap, no two shards are assigned the identical nodes.

In some narrow circumstances, a node may become unavailable, such as a node aging out. In some embodiments, when nodes change due to node unavailability, the shard can be assigned one or more replacement nodes to compensate for the change in the shard that occurs when one or more nodes are removed. However, this should be done only in rare instances because maintaining isolation for requesters prevents a bad actor requester from causing problems beyond their own shard.

Figure 4:
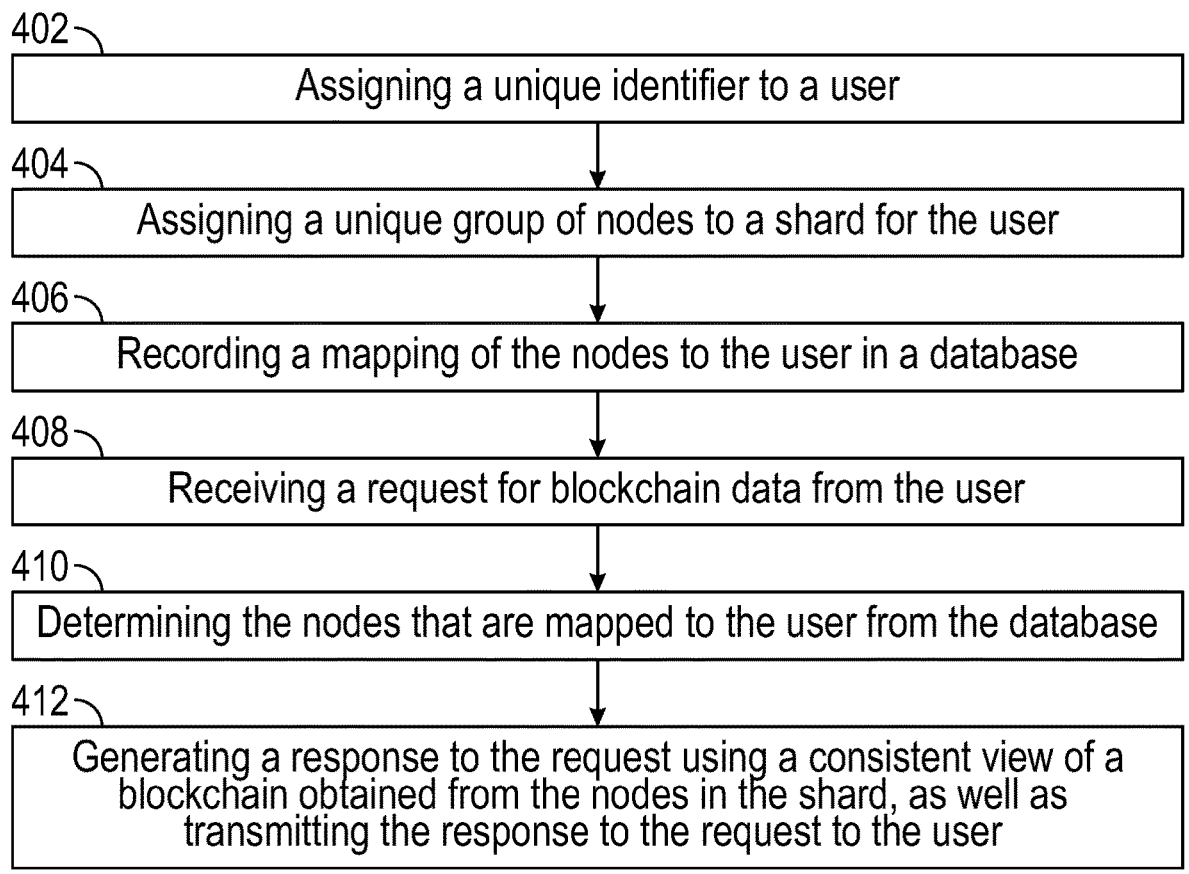
FIG. 4 is a flowchart of an example method for shuffle sharding.

FIG. 4 is a flowchart of one example method for shuffle sharding to create a shard that can respond to requests from a requester. The method can include creating a shard for a requester by an initial step 402 of assigning a unique identifier to a user. The user could be any type of requester or endpoint such as an application or an end user. The unique identifier could be a randomly selected value generated by a random number generator, although any process for generating a random number can be used.

Next, the method can include a step 404 of assigning a unique group of nodes to a shard for the user. The nodes can include a random selection of nodes from a pool of available blockchain nodes. In some embodiments, this process can include selecting a group of nodes for the shard that are a unique set. That is, the group of nodes in the shard are unique, on a per-shard basis. No two shards will share the same combination of nodes, in some embodiments.

The method can include a step 406 of recording a mapping of the nodes to the user in a database. This mapping could include a unique identifier (such as an address or other equivalent) that is linked logically to the unique identifier for the shard. This record can be consulted when future shards are created to ensure that the same exact nodes are not assigned to another shard. Again, as noted above, the nodes assigned to any given shard are selected as a subset of all available nodes in the network. Thus, not only are shards being assigned a random selection of a subset of nodes, but the nodes that are selected are unique. These features reduce a likelihood that when nodes eventually become unavailable that these nodes are not shared amongst many shards.

The method can include a step 408 of receiving a request for blockchain data from the user. It will be understood that the shard can be created for a user prior to a request being submitted or only after a request has been received. Thus, the order of operations is not intended to be limiting unless specifically claimed as such.

The method can include a step 410 of determining the nodes that are mapped to the user from the database. That is, in order to fulfill the request, the nodes assigned to the shard are looked up in the database. This could be accomplished by using the unique identifier assigned to the user. In one example, the user can provide their unique identifier along with their request.

The method then can include a step 412 of generating a response to the request using a consistent view of a blockchain obtained from the nodes in the shard, as well as transmitting the response to the request to the user. A consistent view of the blockchain can be created using the methods described above, which are briefly summarized in FIG. 5.

Figure 5:
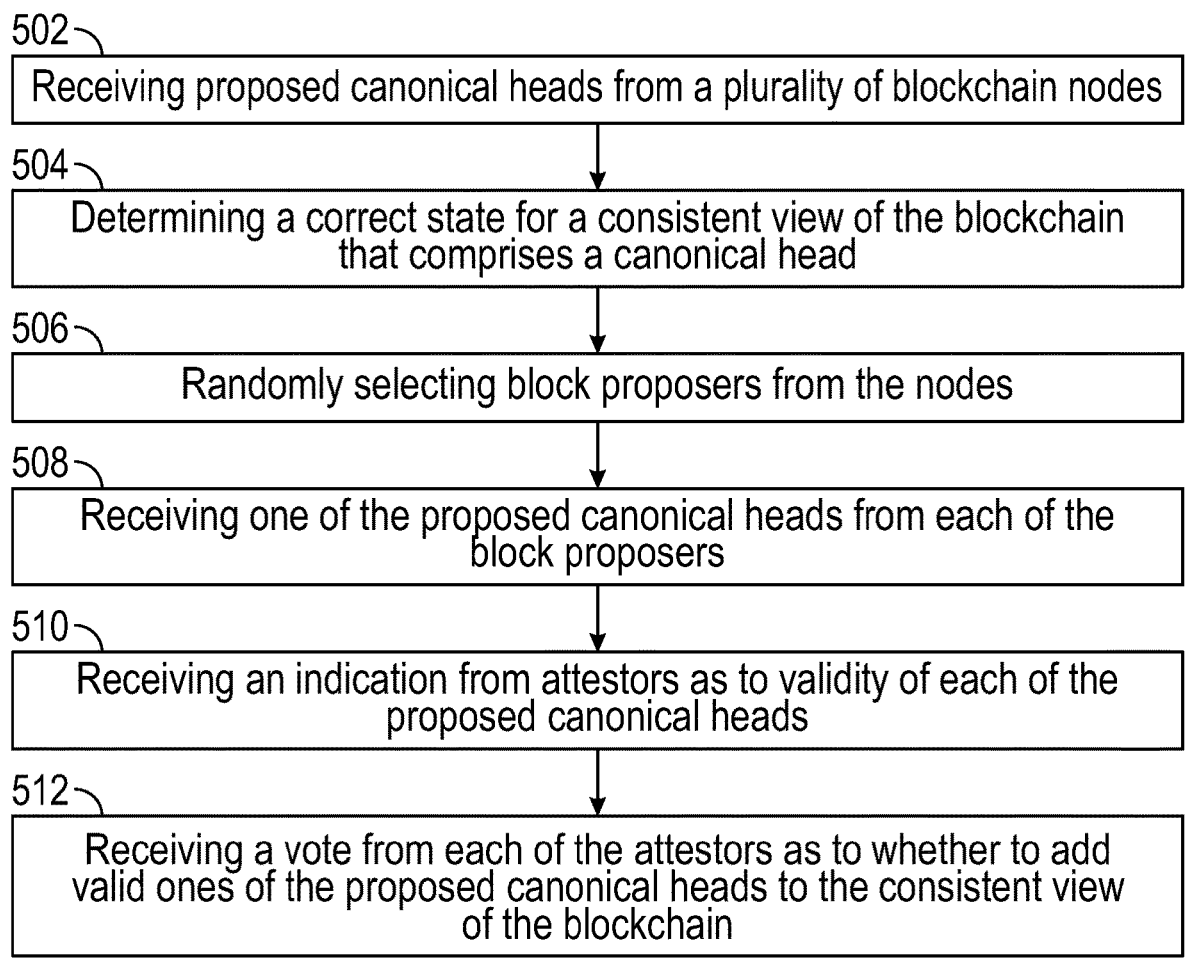
FIG. 5 is a flowchart of an example method for creating a consistent view of a blockchain.

FIG. 5 illustrates an example method for generating the consistent view of the blockchain. The method can include a step 502 of receiving proposed canonical heads from a plurality of blockchain nodes. These nodes can include the nodes assigned to the shard. Next, the method can include a step 504 of determining a correct state for a consistent view of the blockchain that comprises a canonical head. The canonical head can be selected from proposed canonical heads. Also, it will be understood that the blockchain data that is requested is included in the consistent view of the blockchain.

The method can include a step 506 of randomly selecting block proposers from the nodes, as well as a step 508 of receiving one of the proposed canonical heads from each of the block proposers. The method can also include a step 510 of receiving an indication from attestors as to validity of each of the proposed canonical heads, as well as a step 512 of receiving a vote from each of the attestors as to whether to add valid ones of the proposed canonical heads to the consistent view of the blockchain. In some instances, an empty slot is created in the consistent view of the blockchain when one of the block proposers fails to provide a proposed canonical head.

Figure 6:
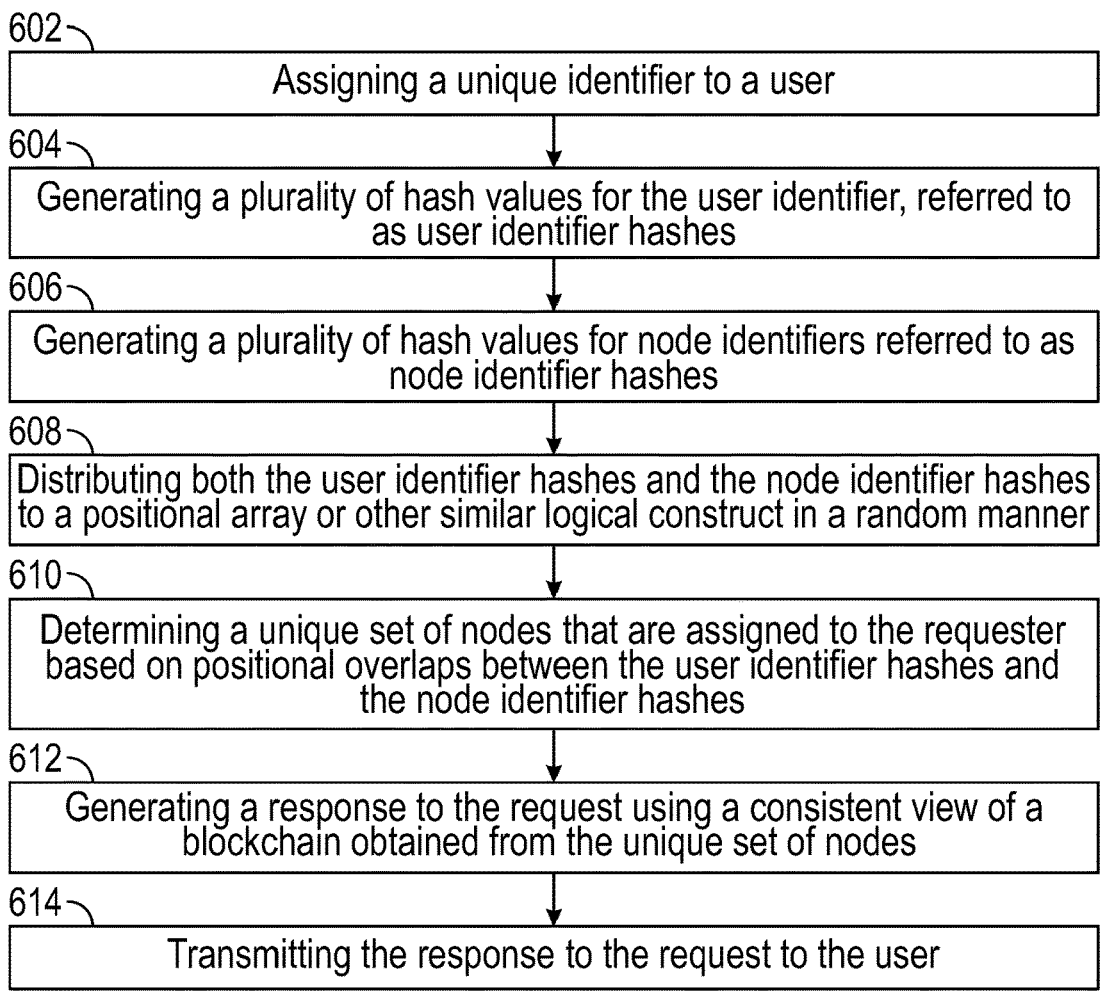
FIG. 6 is a flowchart of another example method for shuffle sharding.

FIG. 6 is a flowchart of an example deterministic method for creating a shard, which also includes a shuffle sharding process. The method can include a step 602 of assigning a unique user identifier to a user. The method can include a step 604 of generating a plurality of hash values for the user identifier, referred to as user identifier hashes. Next, the method can include a step 606 of generating a plurality of hash values for node identifiers referred to as node identifier hashes. To be sure, any suitable hashing function can be used.

The method can include a process of selecting nodes for a requester using a step 608 of distributing both the user identifier hashes and the node identifier hashes to a positional array or other similar logical construct in a random manner. The logical construct could include a matrix with columns and rows. Another logical construct could include a circle that has been subdivided into sectors. Each user identifier hash and node identifier hash can be randomly assigned to a sector. Regardless of the construct, the positions where a user identifier hash and a node identifier hash align (e.g., are co-located in the same sector or cell) indicate an assignment of a node to the requester. This process is used to create a unique set of nodes for the requester. The method can include a step 610 of determining a unique set of nodes that are assigned to the user based on positional overlaps between the user identifier hashes and the node identifier hashes.

In some embodiments, the method can include a step 612 of generating a response to the request using a consistent view of a blockchain obtained from the unique set of nodes. The method can then include a step 614 of transmitting the response to the request to the user.

Figure 7:
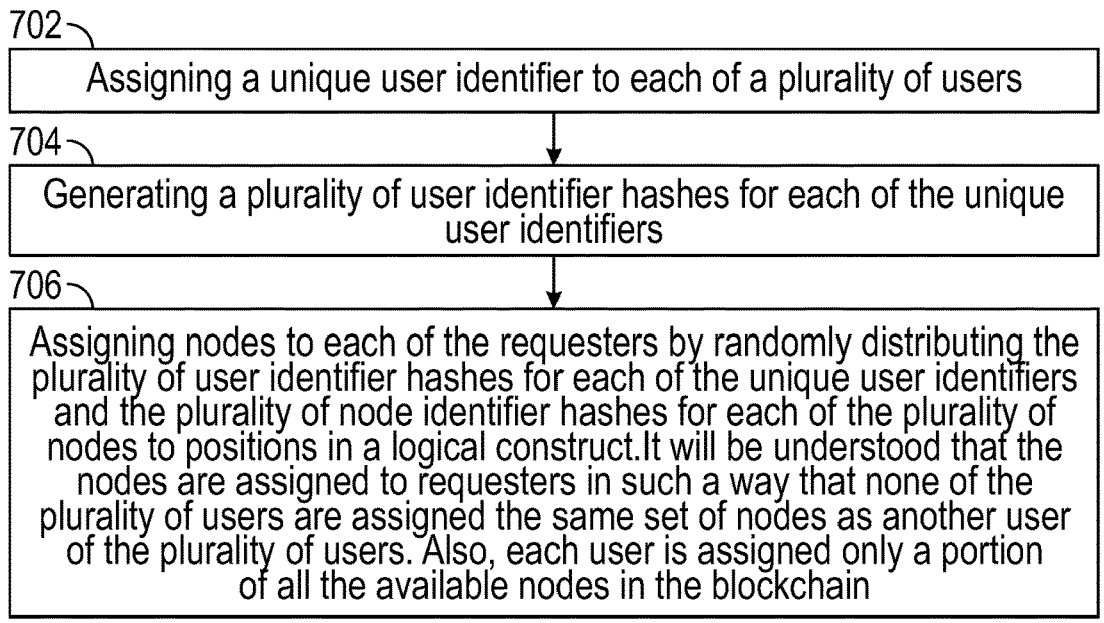
FIG. 7 is a flowchart of an example method for assigning nodes to a requester in a randomly deterministic manner.

FIG. 7 is a flowchart of an example method. The method can include a step 702 of assigning a unique user identifier to each of a plurality of users. The method can also include a step 704 of generating a plurality of user identifier hashes for each of the unique user identifiers. Next, the method includes a step 706 of assigning nodes to each of the requesters by randomly distributing the plurality of user identifier hashes for each of the unique user identifiers and the plurality of node identifier hashes for each of the plurality of nodes to positions in a logical construct. It will be understood that the nodes are assigned to requesters in such a way that none of the plurality of users are assigned the same set of nodes as another user of the plurality of users. Also, each user is assigned only a portion of all the available nodes in the blockchain network. For example, each user may be assigned only 10% of all available nodes.

Figure 8:
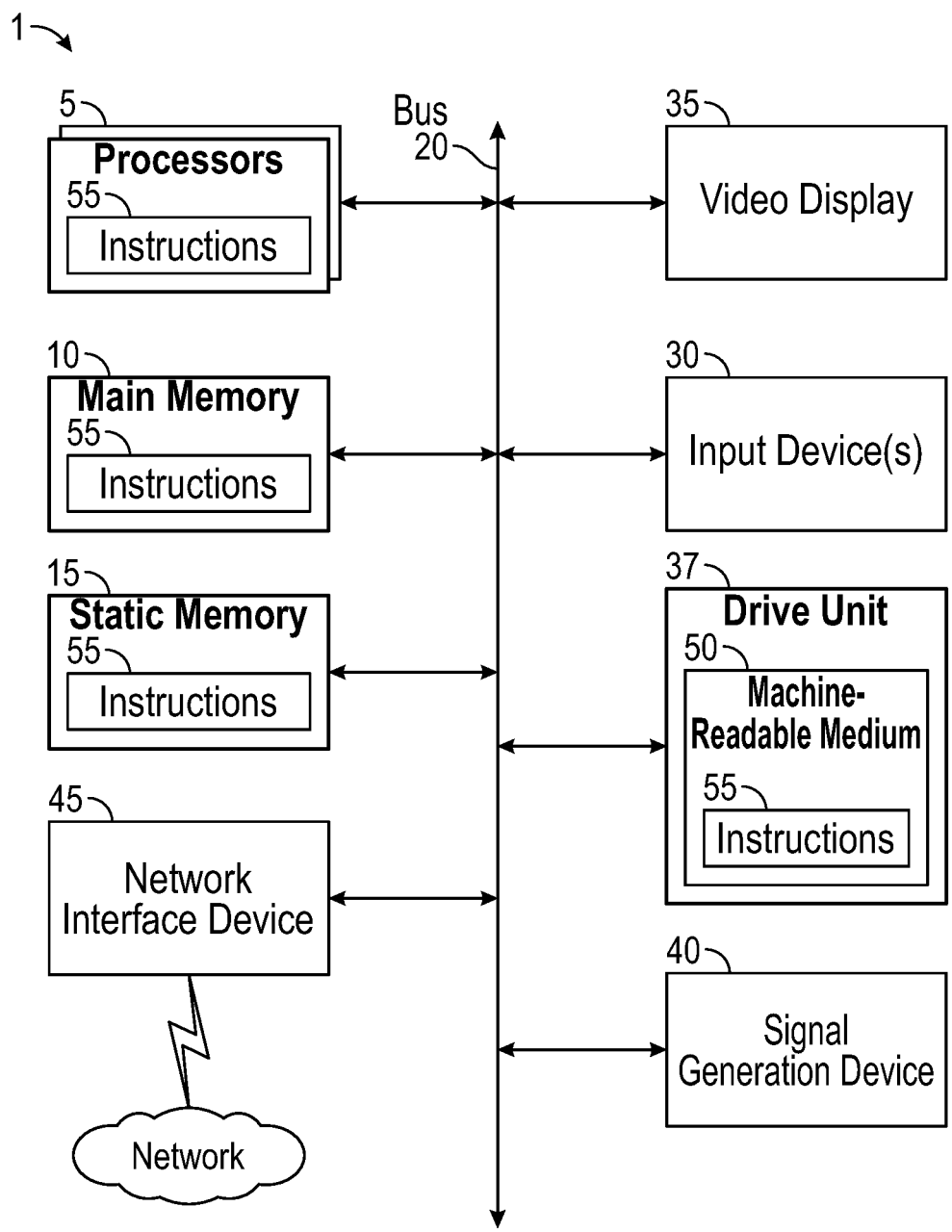
FIG. 8 is a simplified block diagram of a computing system, in accordance with some embodiments.

FIG. 8 is a diagrammatic view of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or decentralized) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or decentralized database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an 110 device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A method comprising:
 assigning a unique identifier to a requester;
 assigning a unique group of nodes to a shard, the unique group of nodes being assigned to the shard based on the requester's uniquely assigned identifier and a deterministic process of creating a plurality of consistent deterministic hash values of the requester's uniquely assigned identifier, the plurality of hash values being used to select the unique group of nodes, a number of hash values created being equal to a number of nodes in the shard;
 assigning the shard to the requester;
 recording a mapping of the shard comprising the unique group of nodes to the requester in a database;
 receiving a request for blockchain data from the requester;
 determining the unique group of nodes comprising the shard that are mapped to the requester from the database;
 generating a response to the request for blockchain data using a consistent view of a blockchain obtained from the unique group of nodes in the shard; and
 transmitting the response to the request to the requester.

2. The method according to claim 1, wherein the nodes are a subset of available nodes.

3. The method according to claim 1, wherein the nodes are assigned to the shard using a randomly deterministic process.

4. The method according to claim 1, further comprising consulting the database to identify the nodes assigned to the shard when the request is received.

5. The method according to claim 1, further comprising generating the consistent view of the blockchain by:
receiving proposed canonical heads from a plurality of blockchain nodes; and
determining a correct state for the consistent view of the blockchain that comprises a canonical head, the canonical head having been selected from the proposed canonical heads, and the blockchain data being included in the consistent view of the blockchain.

6. The method according to claim 5, further comprising generating the consistent view of the blockchain by:
randomly selecting block proposers from the plurality of blockchain nodes; and
receiving one of the proposed canonical heads from each of the block proposers.

7. The method according to claim 6, further comprising receiving an indication from attestors as to validity of each of the proposed canonical heads.

8. The method according to claim 7, further comprising receiving a vote from each of the attestors as to whether to add valid ones of the proposed canonical heads to the consistent view of the blockchain.

9. The method according to claim 8, further comprising creating an empty slot in the consistent view of the blockchain when one of the block proposers fails to provide a proposed canonical head.

10. A system comprising:
a processor and memory for storing instructions, the processor executing the instructions to:
assign a unique identifier to a requester;
assign a unique group of nodes to a shard, the unique group of nodes being assigned to the shard based on the requester's uniquely assigned identifier and a deterministic process of creating a plurality of consistent deterministic hash values of the requester's uniquely assigned identifier, the plurality of hash values being used to select the unique group of nodes for assignment to the shard, a number of hash values created being equal to a number of nodes in the shard;
assigning the shard to the requester;
record a mapping of the shard comprising the unique group of nodes to the requester in a database;
receive a request for blockchain data from the requester;
determine the unique group of nodes comprising the shards that are mapped to the requester from the database;
generate a response to the request for blockchain data using a consistent view of a blockchain obtained from the unique group of nodes in the shard; and
transmit the response to the request to the requester.

11. The system according to claim 10, wherein the nodes are a subset of available nodes, and wherein the nodes are randomly assigned to the shard.

12. The system according to claim 10, wherein the processor is configured to determine when any of one or more of the nodes in the unique group of nodes assigned to the shard are unavailable.

13. The system according to claim 12, wherein the processor is configured to determine a fewest number of node changes to the unique set of nodes to compensate for the one or more of the nodes that are unavailable; and assign replacement nodes to the unique set of nodes based on the fewest number of node changes.

14. The system according to claim 10, wherein the processor is configured to:
receive proposed canonical heads from a plurality of blockchain nodes; and
determine a correct state for the consistent view of the blockchain that comprises a canonical head, the canonical head having been selected from the proposed canonical heads, and the blockchain data being included in the consistent view of the blockchain.

15. The system according to claim 14, wherein the processor is configured to:
randomly select block proposers from the plurality of blockchain nodes;
receive one of the proposed canonical heads from each of the block proposers;
receive an indication from attestors as to validity of each of the proposed canonical heads;
receive a vote from each of the attestors as to whether to add valid ones of the canonical heads to the consistent view of the blockchain; and
create an empty slot in the consistent view of the blockchain when one of the block proposers fails to provide a proposed canonical head.

16. A method comprising:
assigning a unique identifier to a requester;
applying a deterministic function to the requester's unique identifier to select a unique set of nodes that are assigned to a shard, wherein the nodes are a subset of available nodes, the deterministic function comprising creating a plurality of consistent deterministic hash values of the requester's uniquely assigned identifier, the plurality of hash values being used to select the unique set of nodes assigned to the shard, a number of hash values created being equal to a number of nodes in the shard;
receiving a request for blockchain data from the requester;
generating a response to the request using a consistent view of a blockchain obtained from the unique set of nodes; and
transmitting the response to the request to the requester.

17. The method according to claim 16, wherein the nodes are randomly assigned to the shard.

18. The method according to claim 17, further comprising hashing node identifiers of the available nodes to generate a plurality of node identifier hashes.

19. The method according to claim 18, further comprising:
generating a logical construct having positions; and
randomly assigning both a plurality of user identifier hashes and the plurality of node identifier hashes to the positions of the logical construct, wherein the nodes are assigned to the requester when one of the plurality of user identifier hashes and one of the plurality of node identifier hashes are in a same position.

20. The method according to claim 19, further comprising assigning a replacement node to the shard.

21. The method according to claim 16, further comprising generating the consistent view of the blockchain by:
receiving proposed canonical heads from a plurality of blockchain nodes; and
determining a correct state for the consistent view of the blockchain that comprises a canonical head, the canonical head having been selected from the proposed canonical heads, and the blockchain data being included in the consistent view of the blockchain.

22. The method according to claim 21, further comprising generating the consistent view of the blockchain by:
randomly selecting block proposers from the plurality of blockchain nodes;
receiving one of the proposed canonical heads from each of the block proposers;
receiving an indication from attestors as to validity of each of the proposed canonical heads;
receiving a vote from each of the attestors as to whether to add valid ones one of the proposed canonical heads to the consistent view of the blockchain; and
creating an empty slot in the consistent view of the blockchain when one of the block proposers fails to provide a proposed canonical head.

23. A method comprising:
assigning a unique user identifier to each of a plurality of requesters;
generating a plurality of consistent deterministic user identifier hashes for each of the unique requester identifiers;
generating a plurality of consistent deterministic node identifier hashes for each of a plurality of nodes in a blockchain network; and
assigning nodes to each of the requesters by randomly distributing the plurality of user identifier hashes for each of the consistent deterministic unique user identifiers and the plurality of consistent deterministic node identifier hashes for each of the plurality of nodes to positions in a logical construct, wherein nodes are assigned to requesters in such a way that none of the plurality of requesters are assigned a same set of nodes as another requester of the plurality of requesters and a number of nodes assigned to each requestor is equal to a number of user identifier hash values distributed to each requester.

* * * * *